June 24, 1930.    J. F. DRANTER ET AL    1,767,438
BOLT LOCK
Filed Jan. 10, 1928    2 Sheets-Sheet 1

Inventors:
John F. Dranter
Michael Panek
By
Attys.

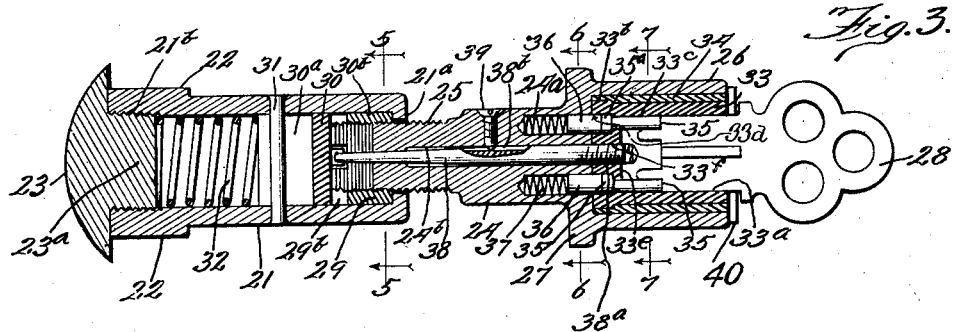
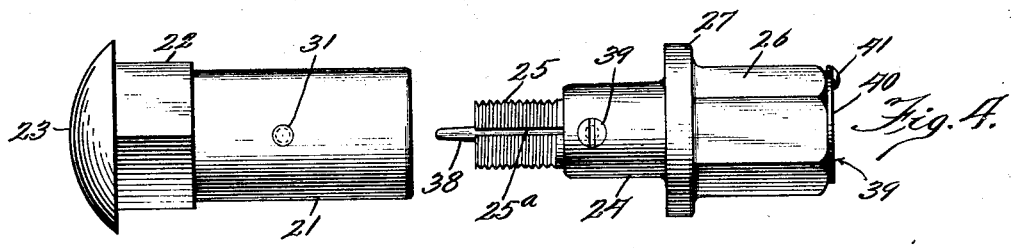
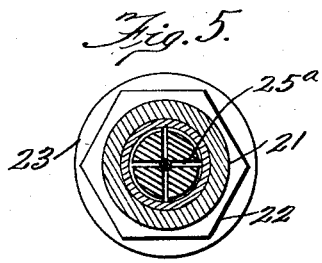
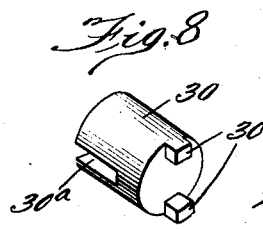
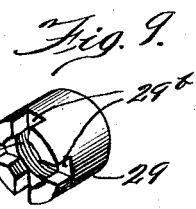
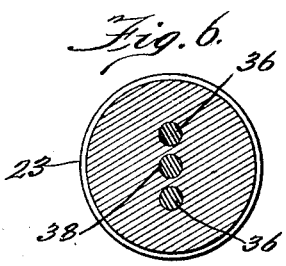
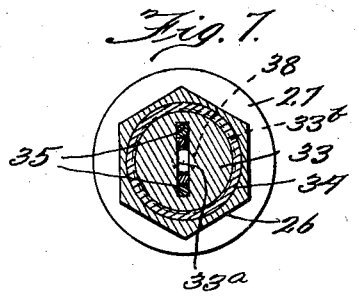

Patented June 24, 1930

1,767,438

UNITED STATES PATENT OFFICE

JOHN F. DRANTER AND MICHAEL PANEK, OF CHICAGO, ILLINOIS

BOLT LOCK

Application filed January 10, 1928. Serial No. 245,760.

Our invention relates to the connection between the fellies and demountable rims of automobile wheels, and more particularly to the securing bolts involved in such connection, it being our main object to provide a bolt of this kind which may be locked to prevent the theft of the tire from the wheel.

A further object of our invention is to design the novel bolt as a substitute for one of the standard bolts, so that the same may be used with these to complete the array of bolts on the wheel without any radical change of installation.

A still further object of our invention is to design the novel bolt so compactly that it will not bear any appreciable distinction from the other bolts in use on the wheel whereby to detract from the uniformity of the arrangement.

Another object of the invention is to enable the novel bolt to use the standard rim and rim-lug equipment of the wheel without any change whatsoever, the novel bolt applying to these parts as effectively as the standard one.

A final, but nevertheless important object of the invention is to construct the novel bolt of few and simple parts, and to locate the working elements thereof internally so as to be away from dust and dirt.

With the above objects in view and any others that may suggest themselves from the specification and claims to follow, a better understanding of the invention may be gained by reference to the accompanying drawings, in which—

Fig. 3 is a cross section through the novel bolt as assembled and ready for manipulation;

Fig. 4 is a plan view showing the major units of the bolt separately;

Figure 1:
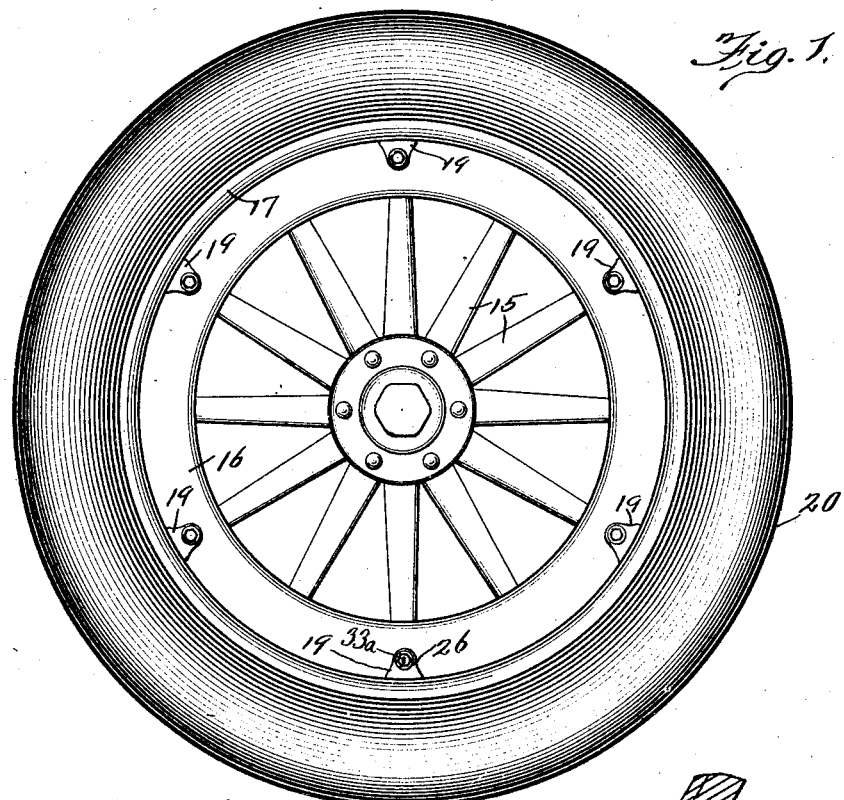
Figure 1 is an elevation of a typical automobile wheel, showing the standard arrangement of a rim connection together with the novel bolt, which for purposes of distinction is shown without a dust plate later to be described.
Figure 2:
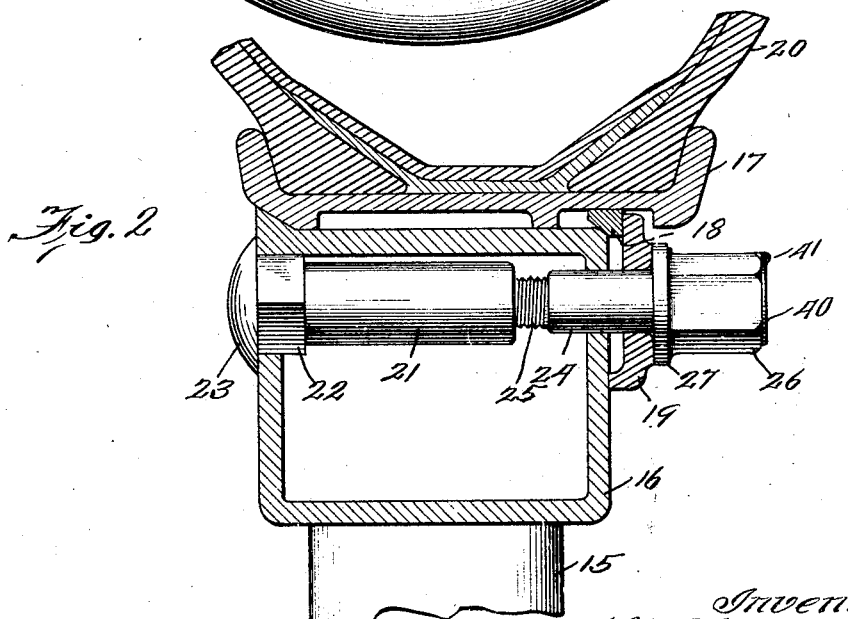
Fig. 2 is an enlarged and fragmental cross section of the bolt installation in the region of the wheel felly and rim.

Figs. 5, 6, and 7 are, respectively, cross sections on the lines 5—5, 6—6, and 7—7 of Figure 3;

Fig. 8 is a perspective view of a retainer detail; and

Fig. 9 is a perspective view of a nut detail.

We are aware of the fact that locking devices for automobile wheel rims have been devised along various lines, but in planning the present invention it was our aim to devise an appliance which is compact and directly applicable to the wheel, preferably by substitution for another part. Obviously, a device substituted for one of the rim securing bolts is the most compact and handiest and probably most effective expedient for the purpose, and it has therefore occurred to us that an appliance of this kind would render the tire safe in spite of the fact that all the remaining bolts on the wheel may be removed.

In carrying out the invention, specific reference to the accompanying drawings reveals the automobile wheel by the numeral 15, the felly thereof by 16, the tire rim by 17, the rim ring by 18, the rim lugs by 19, and the tire by 20. The parts just described are more or less standard, but they may vary in design without prejudice to the installation of the novel appliance.

Our invention is generally divisible into two units, one being considered stationary and the other movable. The first unit consists of the counter-part 21 of the standard rim bolt, the same being of tubular construction having an angular neck 22 and a round head 23 as in the usual case to prevent the bolt from turning in the felly 16. The movable unit generally comprises a round shank 24, a screw nipple 25 projecting from one end thereof, and a polygonal head 26 projecting from the other end, such head having a round base flange 27. While in the ordinary case the bolt is made with a thread to receive an external securing nut, we provide the head 26 to take the place of the nut, making such head take the function of a bolt.

It is our intention to join the movable unit with the stationary one by the act of turning the head 26 with the standard wrench used for tightening rim nuts, and then to apply a key 28 with a suitable movement to lock the units together so that the turning of the head in either direction by an unauthorized person in an effort to remove the bolt would prove unavailing. Conversely, should the key 28 be re-applied and operated in a direction reverse from the original, the units would be unlocked so that the unscrewing motion by the wrench would effect the separation thereof and permit the particular rim lug 19 to be removed for the release of the tire rim.

As noted in Figure 3, the unit 21 is formed with an inward flange 21$^a$ on the inner side, but is open at the outer side and tapped as indicated at 21$^b$ to receive the shank 23$^a$ of the head 23. We construct the head 23 separate from the body of the unit to permit the insertion into the latter of certain parts.

Thus, the unit first receives in smooth sliding relation a ring-nut 29 which is shown more clearly in the perspective view of Figure 9. As noted, the ring-nut is interiorly threaded at 29$^a$, and is cut in the rear end with an array of notches 29$^b$, there being preferably four in number as shown and equally spaced along the periphery of the nut.

Next receivable into the unit 21 is a retainer element 30, which is a cylinder cut in the rear end with a deep medial slot 30$^a$, and having projecting from the front end two opposed lugs 30$^b$ which are arranged in harmony with any two notches 29$^b$ in the ring-nut 29, so that the retainer and the ring-nut may close like a clutch at each 90-degree turn. The retainer is locked against rotary motion in the unit by driving a cross pin 31 through the latter to seat in the slot 30$^a$. Behind the retainer 30 is inserted an expansive coil spring 32, which is backed up by the shank 23$^a$ of the rear head 23. It will be evident that the spring 32 urges the retainer 30 into engagement with the ring-nut 29.

Now taking up the movable unit, it will be noted that the polygonal head 26 is bored from the front to receive a key-operated lock cylinder 33, which is made with a narrow frontal slot 33$^a$ to receive the shank of the key 28. The cylinder 33 is intended to be locked against retraction from the head, and this we accomplish by forming the inner end of the cylinder with an annular enlargement 33$^b$ and driving between the cylinder and the head a sleeve 34, which is recessed in its inner end to correspond with the enlargement 33$^b$. The drive fit of the sleeve 34 is only with the head 26, so that the cylinder is able to turn relative to the sleeve; however, the cylinder cannot be retracted because of the tight fit of the sleeve in the head 26 and the locking relation of the enlargement 33$^b$ and the recess of the sleeve.

The cylinder is bored in continuation of its key-slot 33$^a$ with two narrow passages 33$^c$ in which are slidable stems 35 whose outer ends are adapted to be impinged by the key as the latter is inserted, as clearly shown in Figure 3. The inner ends of the stems 35 are headed as indicated at 35$^a$ and the passages 33$^c$ are correspondingly enlarged 33$^d$ to permit the sliding action of the headed stems. The enlarged passages 33$^d$ are continued in the flanged and shank portions of the movable unit, respectively denoted by 27 and 24, in the form of passages 24$^a$, in which are movable pins 36 which are backed by springs 37. The effect of the springs 37 is to push the pins 36 toward the front and into the passages 33$^d$, whereby the effect is had of locking the key cylinder 33 from turning as against the stock of the head 26, etc. However, by the full insertion of the key 28, the stems 35 may be advanced whereby to sink the pins 36 clear of the inner end of the key cylinder 33, whereby to release the latter for rotation.

The inner end of the key cylinder is made with sufficient stock, as indicated at 33$^e$ to be axially tapped as indicated at 33$^f$ for the front or screw end 38$^a$ of a longitudinal stem 38 axially disposed in a cavity 24$^b$ in the center of the shank 24. This stem is locked against turning by being formed with a longitudinal groove 38$^b$ in which lodges the tip of a set screw 39 threaded into the shank 24 from the side. The stem 38 has a gradual taper in a rearward direction and terminates with a blunt point in the region of the nipple 25. As indicated in Figures 4 and 5, the nipple is split as indicated at 25$^a$ to permit its expansion in the event of the rearward advance of the stem 38, as the latter by its taper would force the sections of the nipple to open, as in the case of a drill chuck jaw. It will now be evident that the turning of the key cylinder 33 in one or the other direction will have the effect of advancing or retracting the stem 38.

In the operation of the novel appliance, one may begin with the locking thereof. In such a case, but the movable unit is handled since the stationary one is lodged in the rear of the felly 16 and is not visible to the attendant. Assuming that the wheel is fully assembled, except for the last or locking bolt, the movable element, seen as in Figure 4, is inserted through the last rim lug 19 and screwed down in the usual manner by the use of the wrench. The key 28 is then inserted in the slot 33$^a$ and turned, for example, in counter-clockwise direction after fully inserted. This action will have the effect of advancing the stem 38 in a rearward direction to impinge on the top of the retainer 30 against the tension of the spring 32 and back the retainer out of engagement with the ring-nut 29 as involving the lugs 30ᵇ and slots 29ᵇ. The ring-nut which was previously locked to the retainer and therefore the stationary unit now is released therefrom, so that the turning of the bolt head 26 by an unauthorized person in either direction will only cause the ring-nut 29 to turn together with the movable element and thus prevent the latter from becoming disengaged from the stationary one. The engagement of the nipple 25 with the ring-nut 29 is very firm, because of the wedging action of the nipple into the nut as induced by the expanding of the nipple sections by the advancing stem 38. Thus, the loosening or withdrawal of the nipple from the nut cannot accidentally occur, as the nipple really wedges into the nut before it takes effect on the retainer 30. Thus, the appliance is locked, and the turning of the head 26 in the thought that it may be removed will avail nothing. Even the continued turning of the key in the same direction will only bring the same to a stop by the extreme wedging of the stem 38 in the nipple, so that the key cylinder 33 will be able to turn no further, since it cannot move in a longitudinal direction by the locking effect of the sleeve 34.

Conversely, when the device is to be unlocked for the removal of the tire, the key is re-inserted as before and turned in the opposite direction. The effect of this action is to withdraw the stem 38 from the retainer whereby to permit the latter to re-engage the ring-nut 29 by means of the lugs 30ᵇ and the notches 29ᵇ, in case the ring-nut is in a receptive position. The key may be turned until the stem has receded so far that the key cylinder 33 can turn no longer. Then the wrench is applied to the head 26 in an unscrewing direction. The moment this movement starts, the ring-nut 29 becomes engageably alined with the retainer 30 and therefore locked in a stationary position. The operation of the wrench therefore secures the unscrewing of the nipple from the ring-nut 29, especially through the fact that the nipple has contracted to its normal girth from the recession of the stem 38, as explained before. The movable unit is thus quickly removed from the stationary one and drawn out, carrying the rim lug 19 with it.

The flanged base 27 of the bolt head 26 is provided for a larger contact with the surface of the rim lug. Also, we have applied a plate 40 in front of the head 26, the plate being pivoted to the latter at 41. This plate serves as a closure for the slot 33ª against dust and foreign matter, but may readily be swung aside to permit the insertion of the key 28.

It will be seen that we have provided a structure which is compact, simple and foolproof. The working parts have definite relations, and the manipulation of the head 26 or the key cannot be extended to work harm within the device. We have shown a simple key cylinder 33 with the operating device within it to serve as a lock, but in practice we may substitute for this cylinder a standard lock-cylinder for which a large variety of keys may be provided. The device is hardly discernible from the front of the wheel and therefore does not detract from the appearance thereof and does not suggest the addition of a mechanical part to the assembly of the wheel. Properly constructed, the appliance should aperate efficiently and have a life of long duration.

While we have illustrated and described the device in the preferred form, it will be evident that the same is capable of many minor changes and refinements, and it is our desire to claim such changes and refinements as coming within the spirit and scope of the appended claims.

We claim:—

1. A bolt lock comprising a stationary member, a complementary member engageable with the latter, means to lock the members together, a key-operated cylinder seated in said complementary member and controlling such means, and an insert sleeve between the cylinder and the stock of the complementary member to lock the cylinder from egress, the sleeve and cylinder having an interfitting relation.

2. A bolt lock comprising a stationary member, a complementary member engageable with the latter, means to lock the members together, a key-operated cylinder seated in said complementary member and controlling said means, said cylinder having an annular enlargement at its base, and an insert sleeve between the cylinder and the stock of the complementary member to lock the cylinder from egress, said sleeve having a recess to receive said enlargement.

3. A bolt lock comprising a housing, a nut in one end of the latter and adapted to receive the bolt from without the housing, a series of clutch teeth formed at the inner end of the nut, a non-rotatable retainer inwardly of the nut, clutch teeth carried by the retainer for meshing with the clutch teeth of the nut whereby to lock the latter from rotation when engaged by the retainer, and a pressure element to urge the retainer into engagement with the nut.

4. A bolt lock comprising a housing, a nut in one end of the latter and adapted to receive the bolt from without the housing, a bifurcated retainer inwardly of the nut, a housing cross-pin straddled by the retainer to render the latter non-rotatable, cooperative clutch elements carried by the nut and the retainer, to lock the nut from rotation when engaged by the retainer, and a pressure element to urge the retainer into engagement with the nut.

5. A bolt lock comprising a keeper, a nut carried by the latter, a bolt engageable with the nut, a retainer normally urged to engage the nut and lock the same against rotation, and means carried within the bolt to back the retainer for the release of the nut when the bolt has been threaded into the latter.

6. A bolt lock comprising a keeper, a nut carried by the latter, a bolt engageable with the nut, a retainer normally urged to engage the nut and lock the same against rotation, and a plunger carried axially by the bolt and operable to back the retainer for the release of the nut when the bolt has been threaded into the latter.

7. A bolt lock comprising a keeper, a nut carried by the latter, a longitudinally-split bolt engageable with the nut, a retainer normally urged to engage the nut and lock the same against rotation, a tapered plunger carried axially by the bolt and adapted to be advanced to back the retainer for the release of the nut when the bolt has been threaded into the latter, the advance of the plunger expanding the bolt whereby to tightly lodge it in the nut.

8. A bolt lock comprising a keeper, a nut carried by the latter, a bolt engageable with the nut, a retainer urged to engage the nut and lock the same against rotation, a plunger carried axially of the bolt to back the retainer for the release of the nut when the bolt has been threaded into the latter, and means to lock the plunger against rotation.

9. A bolt lock comprising a keeper, a nut carried by the latter, a bolt engageable with the nut, a retainer urged to engage the nut and lock the same against rotation, a threaded plunger carried axially of the bolt to back the retainer for the release of the nut when the bolt has been threaded into the latter, a rotatable key-cylinder tapped to receive the plunger for travel, and means to lock the plunger against rotation.

10. A bolt lock comprising a stationary keeper, a nut carried by the latter and adapted to have the bolt threaded into it, means normally locking the nut to the keeper, second means operable to unlock the nut for rotary motion when the bolt has been threaded into the nut, and third means effective to bind the bolt to the nut.

11. A bolt lock comprising a tubular housing threaded at one end to receive a closure-plug and formed with an inward marginal flange at the other end, said housing also having an external angular formation to adapt it for being anchored in a stationary object, a ring-nut slidable within the housing, a retainer non-rotatably disposed in the latter and slidable in the direction of the ring-nut, cooperative clutch elements carried by the retainer and the ring-nut to lock the latter against rotation when retainer engages the ring-nut, a spring in the housing and expansive to urge the retainer into engagement with the ring-nut, a bolt receivable into the ring nut, means to back the retainer for the release of the ring-nut when the bolt has been threaded into the latter, and a key-operated element controlling such means.

In testimony whereof we affix our signatures.

JOHN F. DRANTER.
MICHAEL PANEK.